United States Patent

[11] 3,594,772

[72] Inventor Donald D. Setser
Tulsa, Okla.
[21] Appl. No 752,018
[22] Filed Aug. 12, 1968
[45] Patented July 20, 1971
[73] Assignee The Dow Chemical Company
Midland, Mich.

[54] SLEEP SENSING DEVICE
6 Claims, 4 Drawing Figs.
[52] U.S. Cl.................................................. 340/279,
200/61.54, 180/99, 340/52
[51] Int. Cl............................................G08b 21/00
[50] Field of Search.......................................... 180/97;
200/61.54, 61.55, 61.56, 61.57; 340/52 D, 52 F,
56, 279

[56] References Cited
UNITED STATES PATENTS
3,222,639 12/1965 Kayser, Jr..................... 340/279
2,575,926 11/1951 Murray......................... 340/279
3,227,998 1/1966 Platt............................ 340/279

Primary Examiner—John W. Caldwell
Assistant Examiner—J. Michael Bobbitt
Attorneys—Griswold and Burdick and E. D. Ayers ABSTRACT: The invention relates to apparatus for sensing drowsiness of an operator of a motor vehicle which includes a multiple contact sensing switch coupled to or actuated by movement of the steering mechanism of the motor vehicle, means for maintaining a predetermined charge on a condenser in a relay time constant circuit under one condition of motor vehicle operation, means for discharging said condenser at a predetermined rate if the mode of steering the vehicle is changed, and alarm means actuated by said relay when said condenser's charge level reaches a predetermined level and the output of a generator mechanically coupled to the vehicle drive means and electrically coupled to the alarm circuit exceeds a predetermined voltage.

The output of this generator increases with an increase in road speed of the vehicle. An alarm relay placed in series with the time delay relay contacts controls the operation of the alarm signal. The pull in voltage for this relay is selected so that only when the vehicle reaches a certain selected minimum speed will it be possible to have the alarm relay actuate. It will actuate at any speed above the minimum speed if the driver does not actuate the steering wheel within the time delay interval.

INVENTOR.
Donald D. Setser
BY Earl D. Ayers
AGENT

SLEEP SENSING DEVICE

BACKGROUND OF THE INVENTION

This invention relates to apparatus for detecting sleepiness or drowsiness of the driver of an automotive vehicle and for producing a warning or detection of such sleepiness or drowsiness.

The problem of detecting sleepiness or drowsing in a driver of a motor vehicle has been prevalent since the development of automotive transportation.

Attempts to solve the problem have included foot switches which must be kept activated by pressure applied by the driver's foot, with an alarm sounding when the drowsy driver inadvertently moves his foot. Another device utilizes a set of electrical contacts attached to the eyelids of the driver. Closing of the driver's eyes completes the electrode contacts and actuates an alarm.

The prior art attempts to solve the problem of the sleepy or drowsy driver have had one or more shortcomings.

Either the devices have been attached to the driver or the driver must retain physical contact with the device, and such features are not acceptable as is desired.

Accordingly, a principal object of this invention is to provide improved apparatus for sensing sleepiness or drowsiness in a driver of a motor vehicle.

Another object of this invention is to provide an improved apparatus for detecting sleepiness or drowsiness of a driver of a motor vehicle in which the apparatus is not contacted by the driver.

This invention relates to means for detecting sleepiness or drowsiness in a driver of an automotive vehicle. An electrical sensing switch is coupled to the steering mechanism of the vehicle whereby the normal moving of a steering wheel results in frequent movement of the contacts of the switch.

Actuation of the multicontact switch either charges a charge transfer condenser or, depending on movement of the vehicle's steering wheel, transfers the charge of the transfer condenser to a time constant circuit comprising a storage condenser across which is coupled a relay and a variable resistance element. The value of the charge transfer condenser determines the charging rate of the relay time delay circuit.

When the steering operation occurs energy is taken from a battery by the charge transfer condenser and transferred to the relay time constant circuit. When the electrical potential of the circuit is greater than the pull in potential of the relay, the relay will operate. The normally closed contacts of this relay are connected in series with an alarm relay and a voltage generator.

The voltage generator is driven by an adapter which is attached to the speedometer drive cable outlet from the vehicle's transmission, wheel or differential. The voltage output of the generator is a function of the road speed of the vehicle. When the vehicle is stopped, there is no output from the generator.

The output of this generator increases with an increase in road speed of the vehicle. An alarm relay placed in series with the time delay relay contacts controls the operation of the alarm signal. The pull in voltage for this relay is selected so that only when the vehicle reaches a certain selected minimum speed will it be possible to have the alarm relay actuate. It will actuate at any speed above the minimum speed if the driver does not actuate the steering wheel within the time delay internal.

In accordance with this invention there is provided apparatus for sensing drowsiness of an operator of a motor vehicle which includes a multiple contact sensing switch coupled to or actuated by movement of the steering mechanism of the motor vehicle, means for maintaining a predetermined charge on a condenser in a relay time constant circuit under one condition of motor vehicle operation, means for discharging said condenser at a predetermined rate if the mode of steering the vehicle is changed, the alarm means actuated by said relay when said condenser's charge level reaches a predetermined level.

The invention, as well as additional objects and advantages thereof, will be best understood when the following detailed description is read in connection with the accompanying drawing, in which.

Figure 1:
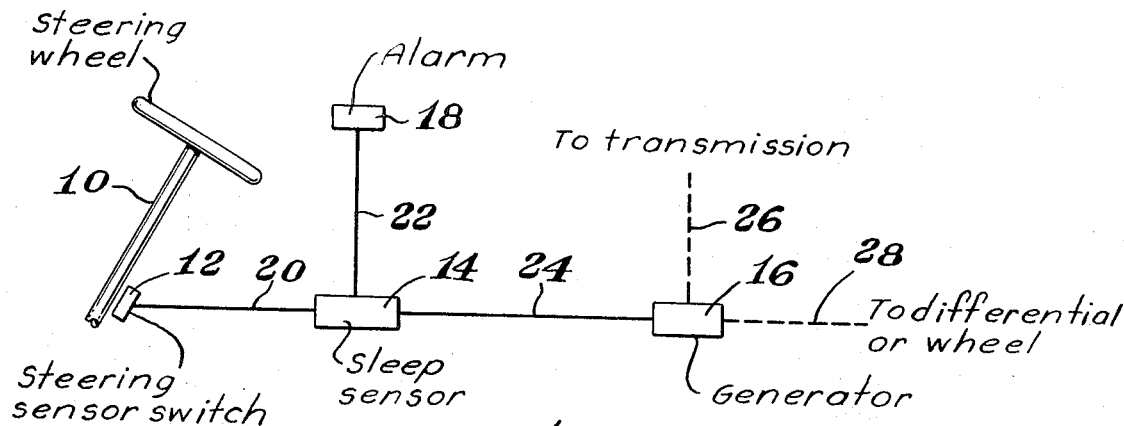
FIG. 1 is a diagrammatical view of apparatus in accordance with this invention.

Referring now to the drawings, and particularly to Fig. 1, there is shown steering apparatus 10 for a motor vehicle (not shown) having a steering sensor switch 12 mechanically coupled thereto. The switch 12 is electrically coupled by cable 20 to a sleep sensor circuit 14 which is coupled by cable 22 to an alarm 18, such as a bell or flashing light, for example. The generator 16 is coupled to the vehicle's transmission 26 or differential by mechanical coupling means 26 and 28 and to the sensor by means 24.

Figure 2:
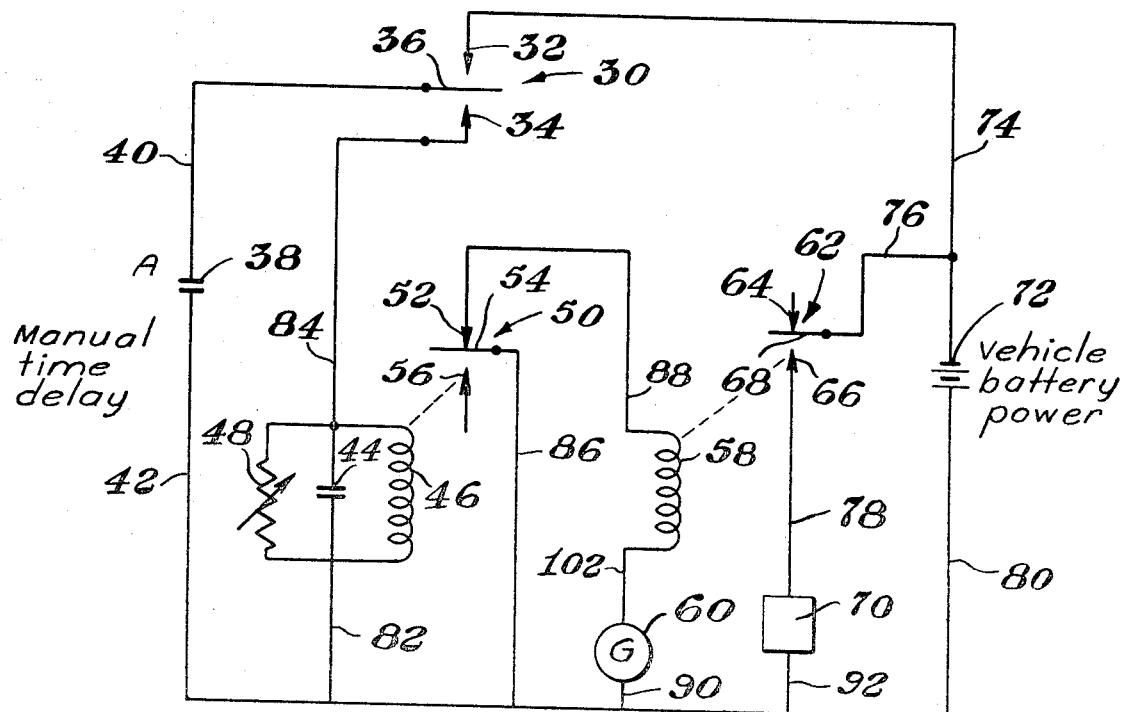
FIG. 2 is a schematic diagram of one embodiment in accordance with this invention.

Referring now to the circuits of Fig. 2, which is a manual time delay sensing apparatus, the steering sensor switch, indicated generally by the numeral 30, has its movable armature contact coupled by means of wire 40 to one side of a charge transfer capacitor 38. One fixed terminal 32 of the switch 30 is coupled by means of wire 74 to a battery 72.

The other terminal of the electrical energy source or battery 72 is coupled to a common conductor 94 by means of a wire 80. The other terminal of the charge transfer capacitor 38 is coupled to the conductor 90 by means of a wire 42.

The second fixed terminal 34 of the switch 30 is coupled by means of a wire 84 to one terminal of a storage condenser 44 whose other terminal is coupled to the conductor 94 by means of wire 82. A variable resistance element 48 and relay coil 46 are coupled in parallel across the storage condenser 44.

The terminal of the movable armature contact 54 of relay 50, of which the coil 46 is a part, is influenced by the degree of energization of the coil 46, and is coupled to the conductor 94 through wire 86.

The relay contact 54 is left open, while the fixed contact 52 is coupled to the common conductor 94 through series connected relay coil 58 of relay 62, generator 60, and wires 88, 102, and 90.

The movable armature contact 68 of relay 62 is coupled to the conductor 74 (connected to one side of the battery 72) by means of wire 76. The fixed relay contact 64 is floating while the other fixed contact 66 is coupled to the other side of the battery 72 through series connected wires 78, 80, 92, and alarm element 70.

In operation, normal movement, even though slight, of the steering apparatus 10 will cause the steering sensor switch (12 in FIG. 1, 30 in Fig. 2) to move its armature element 36 between the fixed contacts 32 or 34.

If the movable contact 36 sets against contact 32, energy from the direct current electrical energy source, battery 72, is fed into the charge transfer condenser 38. If the movable contact 36 is contacting fixed contact 34, energy from the charge transfer condenser 36 is transferred to the time constant circuit comprising parallel connected storage condenser 44, variable resistance element 48 and relay coil 46.

If the electrical potential of the time constant circuit is less than the pull in potential of the contacts of relay 62 because of insufficient transfer of energy from the condenser 38, the movable armature contact 54 is connected to the contact 52 which is series connected to the conductor 90 through the relay coil 58 and generator 60, thus completing a circuit to place the relay coil 58 in parallel across the output of the generator 90. If the motor vehicle to which the generator is coupled exceeds a predetermined speed, the voltage output of the generator 60 energizes coil 58 sufficiently to move armature contact 68 of relay 62 against fixed contact 66, thus completing the circuit to place battery 72 across the alarm device 70 and actuate the alarm.

The capacity of condenser 38 controls the amount of possible energy transfer (per each transfer time) to the storage condenser 44, while the values of the coil 46 and resistance 48 determine the time of discharge of the storage condenser 44. Thus, unless movement of the steering apparatus occurs to a degree sufficient to charge the condenser 38 and then transfer the charge to the storage condenser before the storage condenser discharges sufficiently to let the armature 54 contact terminal 52, the alarm 70 will operate if the output of the generator 60 exceeds a preset amount.

Figure 3:
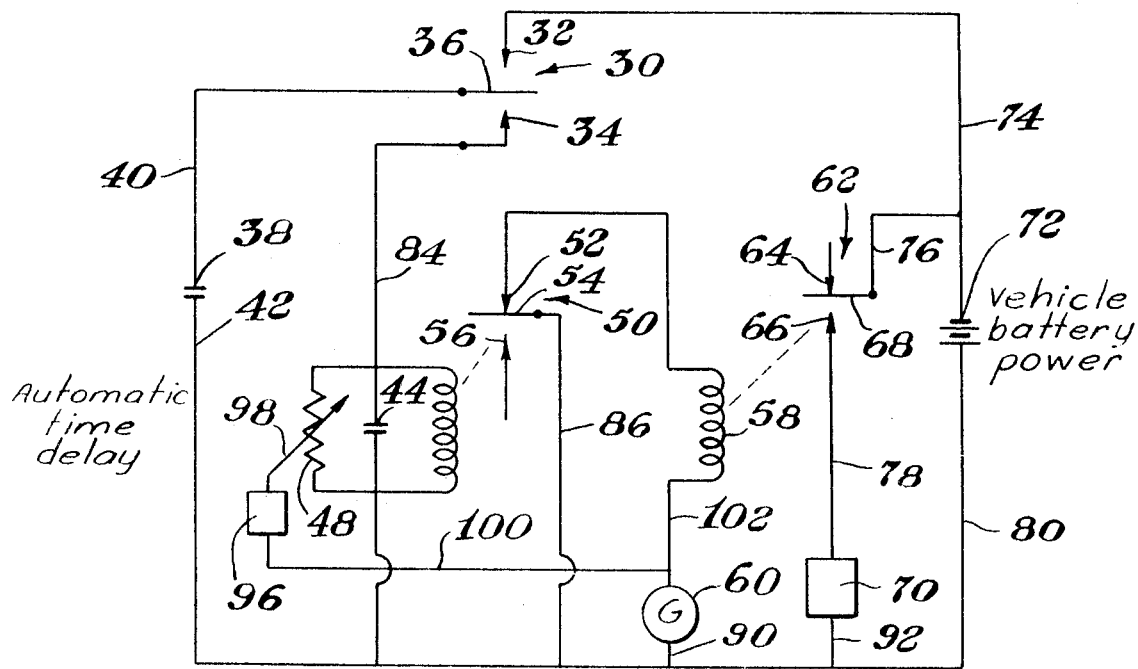
FIG. 3 is a schematic diagram of a modification of the embodiment of Fig. 2.

The circuit of Fig. 3 is basically that of Fig. 2, except that a drive element 96, such as a solenoid driven arm, is coupled to the generator 60 by means of conductors 94 and 100. Mechanical coupling means 98 controls the resistance value of the resistance 44 inversely as the speed of the vehicle, based on the output of the generator 60. (In a similar fashion, a feedback voltage from the generator may be used to decrease the time taken for the relay to deactivate as steering activity decreases by blocking a portion of the voltage across the storage capacitor.) Thus, as the vehicle increases speed, the resistance of the resistor 48 decreases, decreasing the time constant and requiring more frequent slight movement of the steering apparatus of the vehicle to prevent the actuation of the alarm 70. In the circuit shown in Fig. 4, a direct current energy source, such as the battery 104, is coupled by means of wire 148 to the moving armature contact 112 or relay 108 and by series connected wires 160, 176, 178 to one terminal of an alarm device 106. The fixed relay contact 114 is electrically connected to the other terminal of the alarm device 106 by wire 158. The fixed relay terminal 110 is floating. A relay 116 has its movable armature contact 120 coupled by series connected wires 150, 154, 156 to coil 124 of relay 108 and generator 126 to the common conductor 178. Fixed relay terminal 118 is floating while fixed relay contact 122 is coupled to the common conductor 178 through wire 152.

The actuating coil 128 of relay 116 is coupled across a storage condenser 130 which is coupled across the battery 104 on one side by wires 146, 164 and variable resistor 132 and on the other side by conductors 162, 178 and 176.

A sleep sensor switch 134 has its movable armature contact element 138 coupled by means of conductor 168 to one side of charge transfer condenser 142. The other terminal of the condenser 142 is coupled to conductor 178 by the wire 170. The fixed contact 136 of switch 134 is connected through conductors 172, 174 and resistance 144 to conductor 178.

The other fixed contact 140 of switch 134 is coupled by means of wire 166 to the side of condenser 130 to which the variable resistor 132 is coupled.

Figure 4:
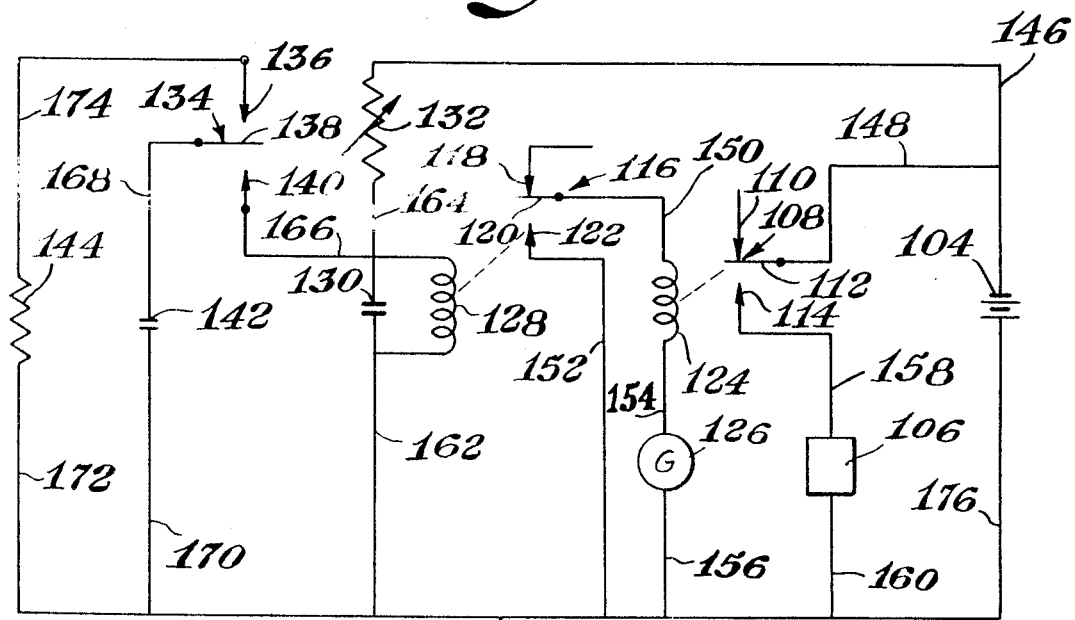
FIG. 4 is a schematic diagram of an alternative embodiment of this invention.

In the apparatus shown in Fig. 4, the time delay circuit charges the time constant condenser 130 through the variable resistance 132. When the voltage across the condenser 130 is greater than the pull in voltage of the relay 116, the relay 116 will actuate and complete the circuit whereby relay 108 may be actuated if the voltage output of the generator 126 is sufficient.

The principal functional difference between the apparatus of Fig. 4, and the embodiments of Figs. 2 and 3 is that in this circuit the delay relay 116 actuates the alarm circuit on activation of the relay rather than on deactivation of the time delay relay as occurs in Figs. 2 and 3.

Further, in Fig. 4. the charge transfer condenser 142 removes charge from the condenser 130, which opposite to the function of the charge transfer condenser in Figs. 2 and 3.

In normal driving operation, the charge transfer condenser 142 removes part of the energy from the time constant condenser 130 and discharges it through the resistor 144. Such more or less continuous charge transfer action prevents the voltage across the time constant condenser 130 from reaching the voltage required to actuate the time delay relay 116.

What I claim is:

1. Apparatus for sensing sleep or drowsiness of a driver of a motor vehicle or the like, comprising
    A. An electrical switch coupled to steering apparatus of a motor vehicle, said switch being a single pole multiple throw type switch, the coupling to said steering apparatus being such that a small movement of the steering apparatus moves the single pole of said switch to one pole or another,
    B. a charge transfer condenser;
    C. a time constant circuit including a storage condenser and at least a coil of a first relay, said coil being coupled across said storage condenser, said first relay having a movable contact and at least one fixed terminal contact;
    D. means for electrically energizing said charge transfer condenser when said pole is at one throw of said switch;
    E. means for transferring electrical energy from said transfer condenser to said storage condenser when said pole is at another throw of said switch;
    F. a second relay having at least a coil, a movable contact and a fixed contact and having its coil electrically coupled to a generator which is mechanically coupled to the drive means of said vehicle, said coil and said generator being connected in series between said movable contact and one fixed contact of said first relay, said movable contact being held away from said fixed contact if said electrical energy from said transfer condenser is transferred to said storage condenser in excess of a predetermined rate; and
    G. an electrically actuated alarm device and electrical energy source connected in series across said fixed and movable contacts of said second relay whereby when said generator and coil circuit are completed and the generator output exceeds a predetermined minimum output the fixed and movable contacts of said second relay are joined and said alarm device is actuated.

2. Apparatus in accordance with claim 1, wherein said means for electrically energizing said charge transfer condenser and said electrical energy source are a single direct current source.

3. Apparatus in accordance with claim 1, wherein a variable resistor is coupled across said storage condenser.

4. Apparatus in accordance with claim 3, wherein resistance value portioning means are coupled between said generator and said variable resistor.

5. Apparatus for sensing sleep or drowsiness of a driver of a motor vehicle or the like, comprising
    A. an electrical switch coupled to steering apparatus of a motor vehicle, said switch being a single pole multiple throw type switch, the coupling to said steering apparatus being such that a small movement of the steering apparatus moves the single pole of said switch to one terminal or another
    B. a charge transfer condenser;
    C. a time constant circuit including a storage condenser and at least a coil of a first relay, said coil being coupled across said storage condenser, said first relay having a movable contact and at least one fixed terminal contact;
    D. means for electrically energizing said storage condenser;
    E. means for transferring electrical energy from said storage condenser to said charge transfer condenser when said pole is at one throw of said switch;
    G. a second relay having at least a coil, a movable contact and a fixed contact and having its coil electrically coupled to a generator which is mechanically coupled to the drive means of said vehicle, said coil and said generator being connected in series between said movable contact and one fixed contact of said first relay, said movable contact being held away from said fixed contact if said electrical energy from said transfer condenser is transferred to said storage condenser at less than a predetermined rate; and
    H. an electrically actuated alarm device and electrical energy source connected in series across said fixed and movable contacts of said second relay whereby when said generator and coil circuit are completed and the generator output exceeds a predetermined minimum output the fixed and movable contacts of said second relay are joined and said alarm device is actuated.

6. Apparatus in accordance with claim 5, wherein said means for electrically energizing said storage condenser and said electrical energy source are a single direct current source.